(12) United States Patent
Zamora et al.

(10) Patent No.: US 8,483,651 B1
(45) Date of Patent: Jul. 9, 2013

(54) NOTIFYING MOBILE-DEVICE USERS OF EMERGENCY VEHICLES

(75) Inventors: Pedro A. Zamora, Kansas City, MO (US); Brian D. Mauer, Shawnee, KS (US); John David Lynch, Olathe, KS (US); Larry D. Cummings, Raytown, MO (US)

(73) Assignee: Sprint Communications Company L.P., Overland Park, KS (US)

( * ) Notice: Subject to any disclaimer, the term of this patent is extended or adjusted under 35 U.S.C. 154(b) by 448 days.

(21) Appl. No.: 12/357,998

(22) Filed: Jan. 22, 2009

(51) Int. Cl.
*H04M 11/04* (2006.01)

(52) U.S. Cl.
USPC .................... 455/404.1; 455/404.2

(58) Field of Classification Search
USPC .......................... 455/404.1, 404.2
See application file for complete search history.

(56) References Cited

U.S. PATENT DOCUMENTS

| | | | |
|---|---|---|---|
| 6,745,021 B1 * | 6/2004 | Stevens | 455/404.1 |
| 6,778,101 B2 | 8/2004 | Turbeville | |
| 6,958,707 B1 * | 10/2005 | Siegel | 340/902 |
| 7,925,423 B2 * | 4/2011 | Howarter et al. | 701/117 |
| 2005/0053209 A1 * | 3/2005 | D'Evelyn et al. | 379/111 |
| 2007/0132608 A1 * | 6/2007 | Votaw et al. | 340/903 |

OTHER PUBLICATIONS

Car-Alert (Model H-108), National Institute on Disability and Rehabilitation Research of the United States Department of Education, http://www.abledata.com/abledata.cfmpageid=19327&top=13464&productid=99024&trail=22,13436&discontinued=1.
Emergency Vehicle Alarm System, http://www.traffic-safety-technologies.com/solution.htm.
Good News for Deaf and Hard of Hearing Drivers, Oct. 31, 1996, http://www.bio.net/bionet/mm/audiologOctober/002170.html.

* cited by examiner

*Primary Examiner* — Kamran Afshar
*Assistant Examiner* — Omoniyi Obayanju (57) ABSTRACT

Methods and systems for providing proximate-and-active-emergency-vehicle notifications to mobile-device users are provided. The emergency vehicle may become active, and its location and status may be received by a network element. A mobile-device user's location may also be received by a network element. It may be determined based on analyzing the location of the emergency vehicle and the location of the mobile-device user to provide the mobile-device user with a proximate-and-active-emergency-vehicle notification.

18 Claims, 7 Drawing Sheets

NOTIFYING MOBILE-DEVICE USERS OF EMERGENCY VEHICLES

SUMMARY

Embodiments of the invention are defined by the claims below, not this summary. A high-level overview of various aspects of the invention are provided here for that reason, to provide an overview of the disclosure, and to introduce a selection of concepts that are further described below in the detailed-description section below. This summary is not intended to identify key features or essential features of the claimed subject matter, nor is it intended to be used as an aid in isolation to determine the scope of the claimed subject matter.

In a first aspect, a method is provided leveraging a mobile device to provide notifications of a nearby emergency vehicle. Generally, when we refer to an "emergency vehicle" herein, we are referring to an active emergency vehicle; that is, one which is attempting to notify drivers of its presence. The method includes receiving emergency-vehicle location data. This emergency-vehicle location data indicates the location of an emergency vehicle. The method also includes receiving mobile-device location data that indicates the location of a mobile device. The method further includes determining that the emergency vehicle is active. The method also includes, based on analyzing the mobile-device location data and the emergency-vehicle location data, determining to provide an emergency-vehicle notification to the mobile device. The method also includes providing an emergency-vehicle notification to the mobile device.

Embodiments of other methods are also provided. For example, another method includes automatically determining that an emergency vehicle is active. The method also includes receiving emergency-vehicle location data that indicates the location of the emergency vehicle. Mobile-device location data is also received. This mobile-device location data indicates the location of a mobile device, which is associated with a user profile of a user. A determination is made that that the user desires to receive emergency-vehicle notifications based on analyzing the user profile. The method further includes automatically determining to provide an emergency-vehicle notification to the user based on comparing the mobile-device location data with the emergency-vehicle location data. The method still further includes providing an emergency-vehicle notification to the user.

In another embodiment, a method is provided that includes receiving emergency-vehicle location data. This emergency-vehicle location data indicates the location of an emergency vehicle. The method also includes receiving mobile-device location data. This mobile-device location data indicates the location of a mobile device, which has stored profile-data for a user. The method further includes automatically determining that the emergency vehicle is active. The method also includes, in response to automatically determining that the emergency vehicle is active, automatically determining to communicate a notification to the mobile device based on analyzing the mobile-device location data and the emergency-vehicle location data. The method further includes, in response to automatically determining to communicate a notification to the mobile device, communicating a notification to the mobile device. The method still further includes receiving the notification by the mobile device. The method still further includes, in response to receiving the notification by the mobile device, automatically determining to provide an emergency-vehicle notification to the mobile-device user based on analyzing the stored profile-data. The method also includes, in response to automatically determining to provide the emergency-vehicle notification to the mobile-device user, providing the emergency-vehicle notification to the mobile-device user.

BRIEF DESCRIPTION OF THE SEVERAL VIEWS OF THE DRAWINGS

Illustrative embodiments of the present invention are described in detail below with reference to the attached drawing figures, and wherein.

DETAILED DESCRIPTION

The subject matter of embodiments of the present invention is described with specificity herein to meet statutory requirements. But the description itself is not intended to necessarily limit the scope of claims. Rather, the claimed subject matter might be embodied in other ways to include different steps or combinations of steps similar to the ones described in this document, in conjunction with other present or future technologies. Terms should not be interpreted as implying any particular order among or between various steps herein disclosed unless and except when the order of individual steps is explicitly described.

Throughout this disclosure, several acronyms and shorthand notations are used to aid the understanding of certain concepts pertaining to the associated system and services. These acronyms and shorthand notations are intended to help provide an easy methodology of communicating the ideas expressed herein and are not meant to limit the scope of the present invention. The following is a list of these acronyms:

ASL American Sign Language
BSC Base Station Controller
BTS Base Transceiver Station
CD-ROM Compact Disc Read-Only Memory
DVD Digital Versatile Discs
EEPROM Electrically Erasable Programmable Read-Only Memory
GPS Global Positioning System
HLR Home Location Register
LBS Location Based Services
MSC Mobile Switching Center MSCS Mobile Switching Center Server
PDA Personal Data Assistant
PSAP Public Safety Answering Point
RAM Random Access Memory
RFID Radio Frequency Identification
ROM Read Only Memory
SIP Session Initiation Protocol
SMSC Short Message Service Center Further, various technical terms are used throughout this description. An illustrative resource that fleshes out various aspects of these terms can be found in Newton's Telecom Dictionary by H. Newton, 24th Edition (2008).

Embodiments of the present invention may be embodied as, among other things: a method, system, or set of instructions embodied on one or more computer-readable media. Computer-readable media include both volatile and nonvolatile media, removable and nonremovable media, and contemplates media readable by a database, a switch, and various other network devices. By way of example, and not limitation, computer-readable media comprise media implemented in any method or technology for storing information. Examples of stored information include computer-useable instructions, data structures, program modules, and other data representations. Media examples include, but are not limited to information-delivery media, RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data momentarily, temporarily, or permanently.

Figure 1:
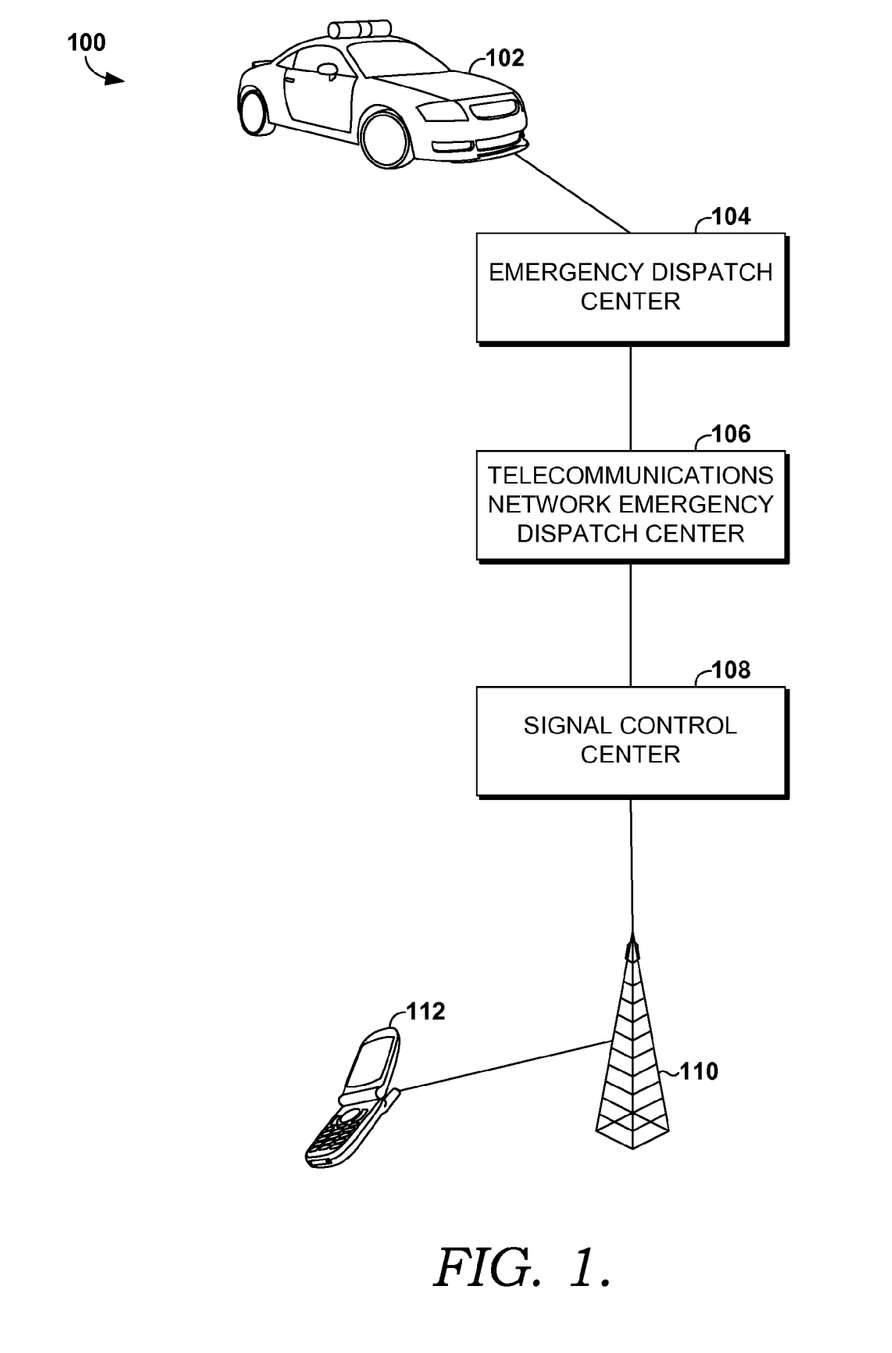
FIG. 1 depicts a block diagram of an exemplary system in accordance with an embodiment of the present invention.

Turning now to FIG. 1, a block diagram of an exemplary system in accordance with an embodiment of the present invention 100 is provided. An emergency vehicle 102 is shown which communicates with emergency dispatch center 104. Emergency dispatch center 104 communicates with telecommunications network emergency dispatch center 106, which in turn communicates with a signal control center 108. Signal control center 108 communicates with base transceiver station (BTS) 110, which in turn wirelessly communicates with mobile device 112 in one embodiment.

To further illustrate, emergency vehicle 102 may become active. Being active generally refers to an emergency vehicle that is responding to an emergency event. The emergency vehicle might be a police car, van, fire truck, ambulance, or any other type of emergency response vehicle or vehicle that is equipped with components that are used to notify others of its presence. The emergency vehicle may activate lights, sirens, or other indications to signal that it has become active and to notify those nearby. In one embodiment these sirens, lights or other indications, or the switch that causes them to become activated, cause a device in the vehicle to signal emergency dispatch center 104 that emergency vehicle 102 has become active. Alternatively, the operator of emergency vehicle 102 might signal emergency dispatch center 104 that emergency vehicle 102 is active.

Emergency dispatch center 104 receives a signal that emergency vehicle 102 is active and signals telecommunications network emergency dispatch center 106. Telecommunications network emergency dispatch center 106 signals signal control center 108, which signals BTS 110. In one embodiment, BTS 110 signals mobile device 112, alerting the user of mobile device 112 that emergency vehicle 102 is proximate-and-active. Being provided with a notification that an emergency vehicle is proximate-and-active indicates to the mobile-device user that emergency vehicle 102 is somewhere in the vicinity of mobile device 112—perhaps within a few blocks or so. The proximate-and-active notification might be provided to the user as a vibration, a set of vibrations, a flashing light, a text message, a Bluetooth communication to a Bluetooth enabled device which then alerts the mobile-device user via flashing light, etc.

Figure 2:
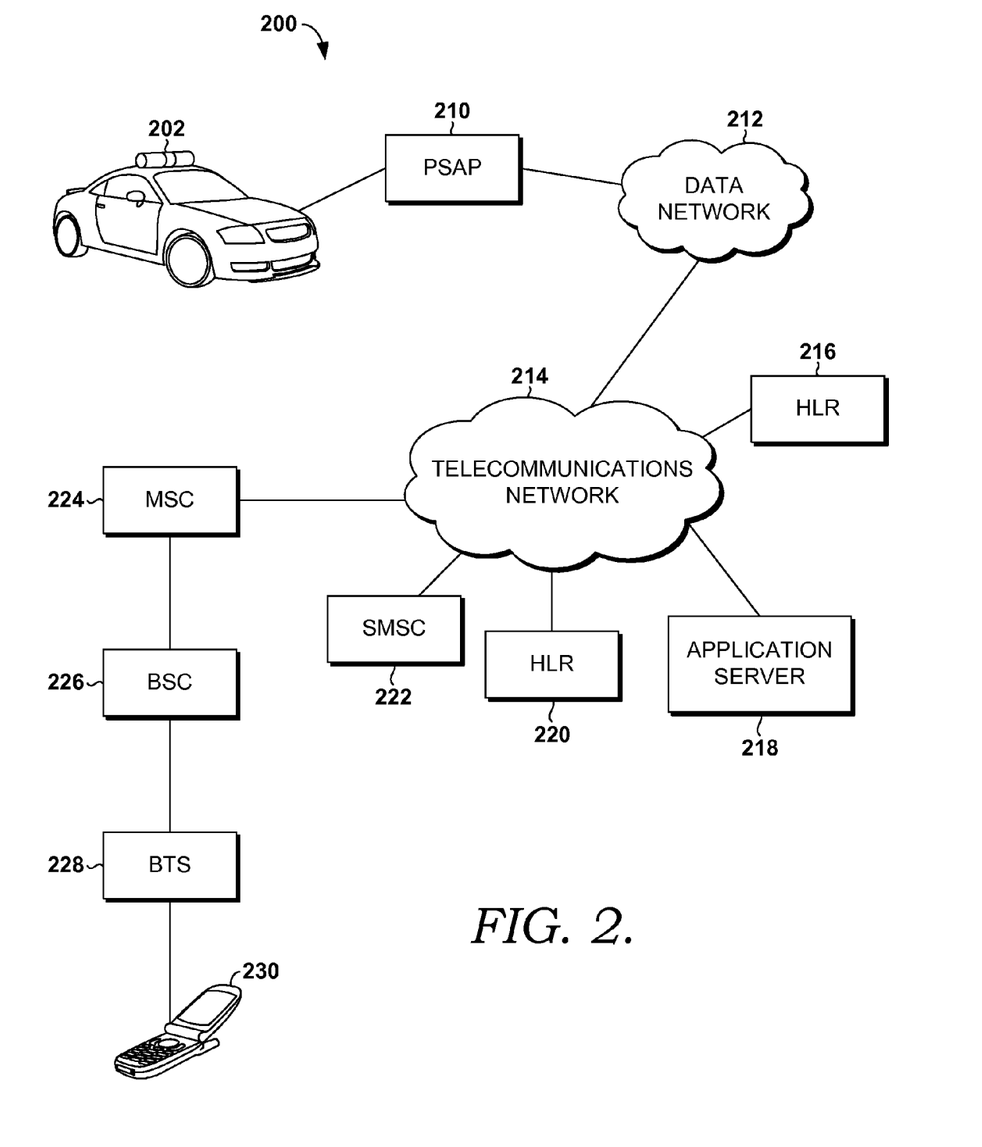
FIG. 2 depicts another block diagram of an exemplary system in accordance with an embodiment of the present invention.

Turning now to FIG. 2, another block diagram of an exemplary system in accordance with an embodiment of the present invention 200 is provided. Emergency vehicle 202 communicates with PSAP 210, which communicates with data network 212. Data network 212 communicates with telecommunications network 214, which is in communication with HLR 216, Application Server 218, LBS 220, SMSC 222, and MSC 224. MSC 224 communicates with BSC 226, which communicates with BTS 228. BTS 228 communicates with mobile device 230.

For example, an operator of emergency vehicle 202 might cause emergency vehicle 202 to become active. Emergency vehicle 202 communicates its location to PSAP 210 and that it has become active. PSAP 210 communicates, through data network 212 and telecommunications network 214, with application server 218. Application server 218 might communicate with HLR 216 to determine what users are interested in being provided with an emergency-vehicle notification. These users are interested users, and might be determined to be interested by their proximity to the emergency vehicle (determined, for example, through the use of GPS data, BTS station data, available wireless networks data, gyroscopic data, or other such location data, etc). Alternatively, application server might communicate with LBS 220 to determine one or more interested users based on their respective locations. Interested users may also be determined to be interested by analyzing a stored profile, which may include information such that the user has previously indicated interest in receiving proximate-and-active-emergency-vehicle notifications or that the user is hearing impaired, for example. It should also be noted that application server 218 may be intermittently updated with interested users from HLR 216 or LBS 220, and so may not need to be communicated this information again.

Application server 218 determines that there are one or more interested users, and it can provide one or more of these interested users a text message, for example. Application server 218 communicates with SMSC 222, which in turn communicates with MSC 224. MSC 224 communicates with BSC 226, which in turn communicates with BTS 228. BTS 228 transmits the text message to mobile device 230, alerting the interested user that an emergency vehicle is proximate-and-active. There are more arrangements, combinations and subcombinations of processes and devices that allow text messages to be transmitted to a mobile device in accordance with the present invention—including, for example, having SMSC 222 communicate with HLR 216 to determine that an interested user can be reached through communication with MSC 224.

Alternatively, application server 218 might determine to provide one or more interested users with a call to notify these interested users of a proximate-and-active-emergency-vehicle. For example, the operator of emergency vehicle 202 might communicate to PSAP 210 that emergency vehicle 202 is active, along with emergency-event location data. Emergency-event location data may be the address of a fire to which emergency-vehicle 202 is responding, for example. PSAP 210 might communicate the location of emergency and the emergency-event location-data, through data network 212 and telecommunications network 214, with application server 218. Application server 218 determines one or more anticipated future-locations for the emergency vehicle. For example, there might exist a list of predetermined routes that emergency vehicle 202 will follow when proceeding from its current location to the event location. Alternatively, application server 218 might calculate possible routes from the current location of emergency vehicle 202 to the event location, using a number of methods (such as those used in online mapping sites, etc). Application server 218 communicates with MSC 224, which communicates with BSC 226. BSC 226 communicates with BTS 228 to place a call to mobile device 230. This call might be a voice call notifying the user that there is a nearby and active emergency vehicle. This call might include the location or anticipated future location or locations of the emergency vehicle.

It should also be noted that other notification methods might be utilized in accordance with the present invention. For example, a video message might be transmitted to the mobile-device user through a SIP proxy. The video might be a video file, streaming video, or other video formats. The video might, for example, include ASL gestures giving a notification that an emergency vehicle is proximate-and-active.

Figure 3:
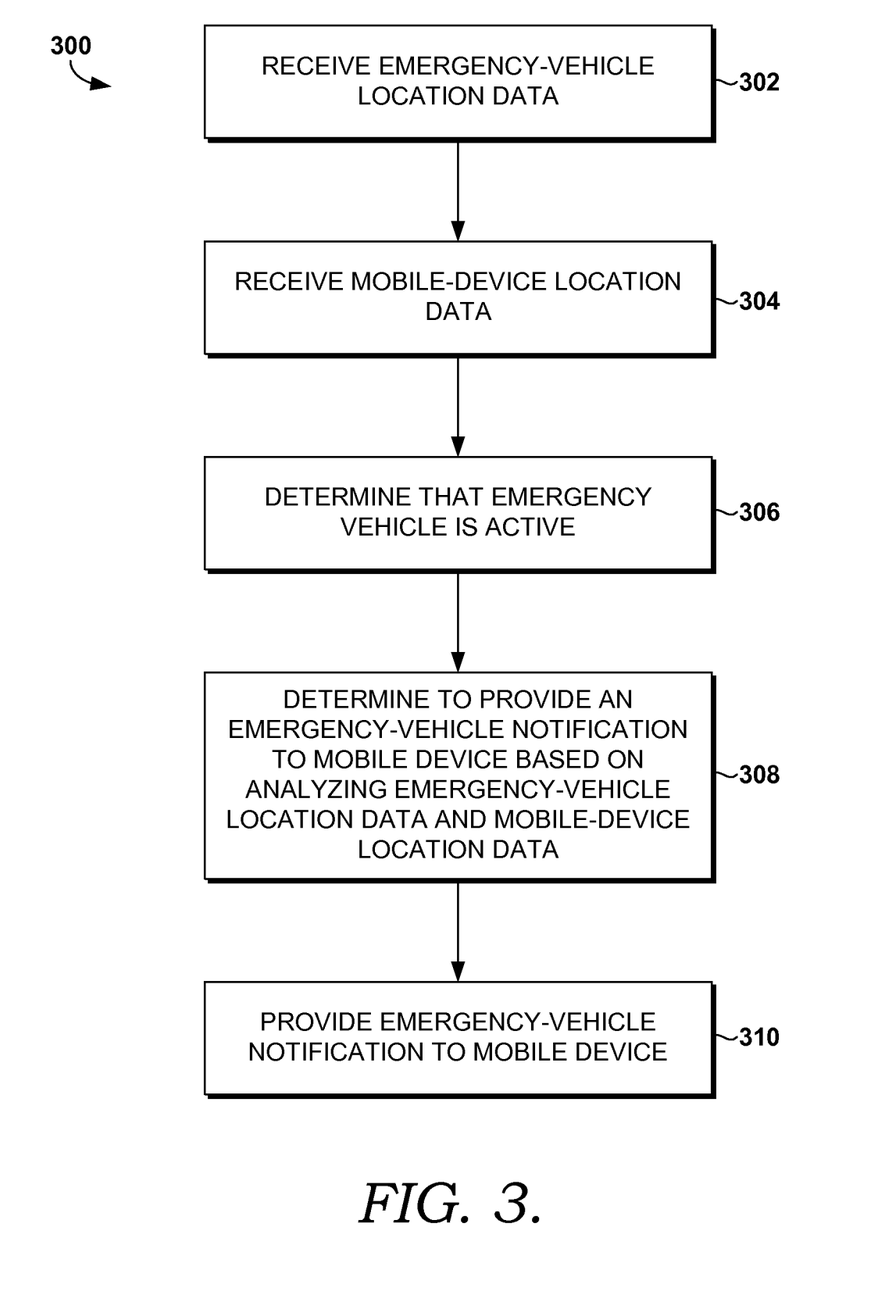
FIG. 3 depicts a flow diagram showing a method for providing an emergency-vehicle notification to a mobile device in accordance with an embodiment of the present invention.

Turning now to FIG. 3, a flow diagram showing a method for providing an emergency-vehicle notification to a mobile device in accordance with an embodiment of the present invention 300 is depicted. At block 302, emergency-vehicle location data is received. Mobile-device location data is also received, as shown at block 304. At block 306, it is determined that the emergency vehicle is active. At block 308, it is determined based on analyzing emergency-vehicle location data and mobile-device location data to provide an emergency-vehicle notification to the mobile device. At block 310, an emergency-vehicle notification is provided to the mobile device.

For example, an emergency vehicle might include a GPS device. This GPS device might be part of or connected to a device that can transmit GPS data to a communications network. This GPS data might be received at a network element as shown at block 302. For example, this GPS device might transmit location data for the emergency vehicle which is received by a PSAP at block 302. This location data might be transmitted to and received by other parts of the network (such as an HLR, LBS, Application Server, etc). Alternatively, the emergency vehicle might include a device that connects to a network through one or more BTSs. The location and ability to connect to one or more BTSs provide an approximate location. Further, the ability to connect to one or more wireless networks, such as wireless routers commonly utilized by consumers, provides the ability to determine an approximate location. These methods of providing location data are meant to be illustrative, and there are other ways for obtaining emergency-vehicle location data.

At block 304, mobile-device location-data is received. For example, a user may be carrying a PDA or other computerized device capable of receiving wireless data through either internal components or an inserted dongle which connects to a network through a BTS. The location of this BTS can be received, as shown at block 304, and used to approximate the location of the mobile device. Alternatively, the mobile device might be a cell phone with GPS capability. The GPS location of the cell phone might be transmitted from the cell phone over the network and received by an LBS, as shown at block 304. Again, these methods of providing location data are meant to be illustrative, and there are other ways of obtaining mobile-device location data.

At block 306, it is determined that the emergency vehicle is active. For example, the emergency vehicle might have a PDA or other device capable of connecting to a telecommunications network through a BTS. The operator or passenger of the emergency vehicle might use such a device to indicate to the network that the vehicle has become active. Alternatively, the emergency vehicle equipment responsible for activating the siren, lights, etc may be connected to a device that can indicate to the network that the vehicle has become active. This may be accomplished through communicating with a PSAP, BTS, or other means. The operator or other passenger of the emergency vehicle might, in another example, place a call or communicate over radio that the emergency vehicle has become active. In yet another example, the dispatch center which communicates emergency events to emergency vehicles might indicate to the network that an emergency vehicle has become active.

At block 308, it is determined based on analyzing emergency-vehicle location data and mobile-device location data to provide an emergency-vehicle notification to the mobile device. For example, in response to determining that the emergency vehicle is active, an application server might analyze the emergency-vehicle location data to determine that all users connected to a particular BTS are near the emergency vehicle and should receive an emergency-vehicle notification. Alternatively, the emergency-vehicle location data might include GPS data received from a device within or connected to the emergency vehicle. An application server might analyze this GPS data to determine that users connected to a particular BTS are proximate to the emergency vehicle and should receive an emergency-vehicle notification. In yet another alternative, the emergency-vehicle location data may include GPS data received from a device within or connected to the emergency vehicle. An application server may analyze this GPS data to determine that a mobile device that has transmitted GPS data is within a certain radius of the emergency vehicle and so should receive an emergency-vehicle notification. In still another alternative, the emergency-vehicle location data might include available wireless networks data received from a device within or connected to the emergency vehicle, such as, for example, a laptop. An application server might analyze this available wireless-networks data to determine that the emergency vehicle is approximately at a location. The application server might then determine that a certain user is within a certain radius of this location by analyzing the user's mobile-device location data. The application server might determine that the user has previously requested that he or she be provided with emergency-vehicle notifications when an emergency vehicle is this nearby.

At block 310, an emergency-vehicle notification is provided to the mobile device. For example, upon determining that the mobile-device user is an interested user (that is, that the mobile-device user desires to receive emergency-vehicle notifications), the application server might cause a text message to be displayed on the mobile device. This might be accomplished, for example, by the application server communicating with an SMSC through a telecommunications network, which communicates with an appropriate MSC. The MSC communicates with a BSC, which communicates with an appropriate BTS. The BTS causes the mobile device to display a text message, notifying the user that an emergency vehicle is proximate-and-active. The text message might state that an emergency vehicle is near. The text message might also or alternatively state the location of the emergency vehicle, the route of the emergency vehicle, possible future locations of the emergency vehicle, etc.

Figure 4:
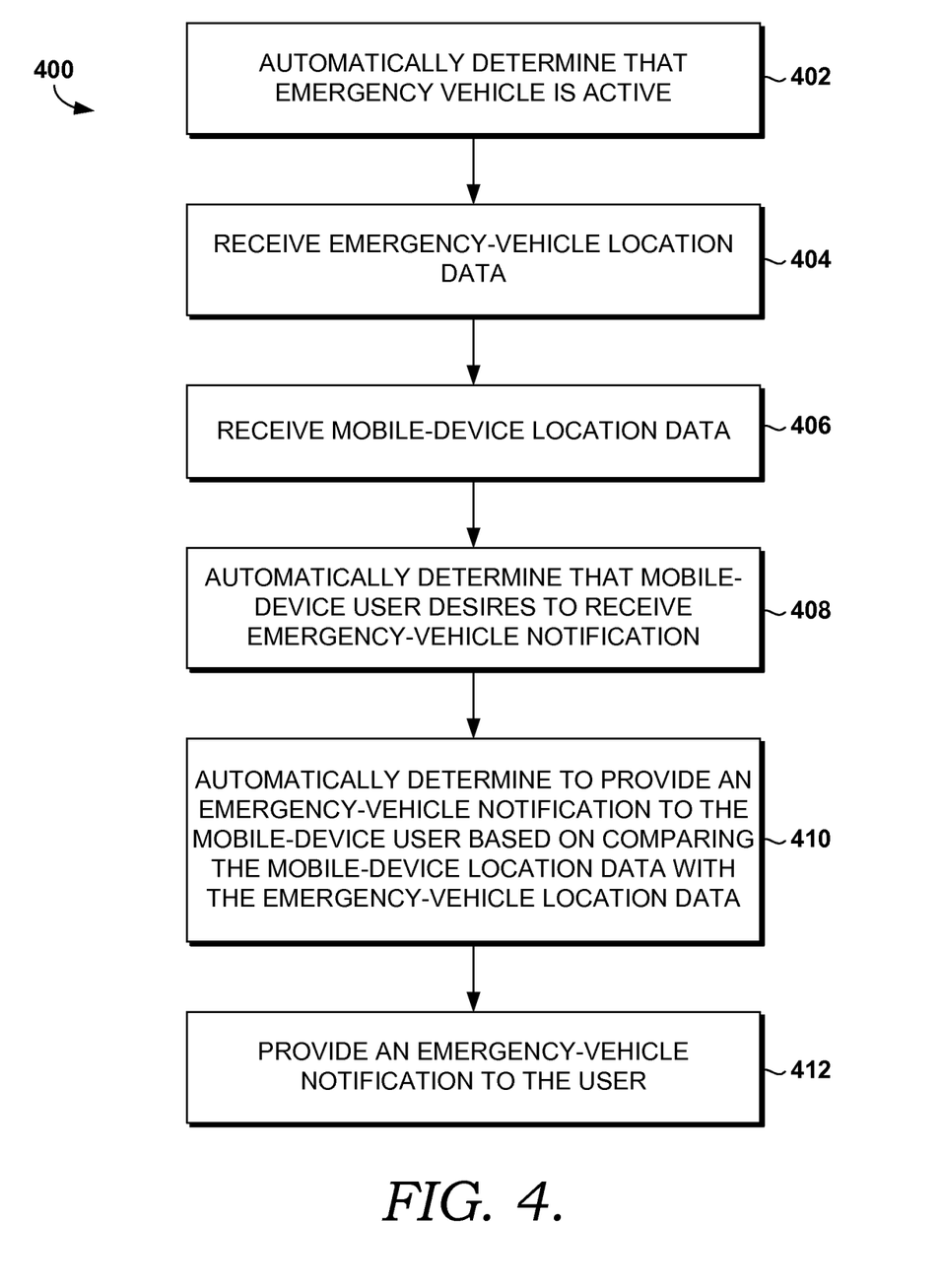
FIG. 4 depicts another flow diagram showing another method for providing an emergency-vehicle notification to a user in accordance with an embodiment of the present invention.

Turning now to FIG. 4, a flow diagram showing a method for providing an emergency-vehicle notification to a mobile-device user in accordance with an embodiment of the present invention 400 is depicted. At block 402, it is automatically determined that an emergency vehicle is active. At block 404, emergency-vehicle location data is received. Mobile-device location data is also received, as shown at block 406. At block 408, it is automatically determined that a user desires to receive emergency-vehicle notification based on analyzing the user profile. It is also automatically determined, based on analyzing emergency-vehicle location data and mobile-device location data, to provide an emergency-vehicle notification to mobile-device user, as shown at block 410. At block 412, an emergency-vehicle notification is provided to mobile-device user.

For example, at block 402 it is determined that the emergency vehicle is active. For example, the emergency vehicle might have a wireless transmitting device or other device capable of connecting to a cellular network through a PSAP or BTS that can indicate to a telecommunications network that the vehicle has become active. The emergency vehicle might also include a device that can transmit GPS data or other location data to the telecommunications network. This data is received by the network as shown at block 404. For example, a telecommunications network device within the emergency vehicle might indicate to the telecommunications network that the emergency vehicle is active at block 402. This device might be connected to a BTS—which allows for the approximate location of the emergency vehicle to be deduced. This approximate location might be transmitted to and received by an application server, as illustrated at block 404. This location data might then be transmitted to and received by other parts of the network (such as an HLR, LBS, application server, etc).

At block 406, mobile-device location data is received. For example, a mobile-device user might be carrying a laptop which connects to a telecommunications network via a wireless connectivity card that connects to a BTS. The location of this BTS can be received, as shown at block 406, and used to approximate the location of the mobile-device user.

At block 408, it is automatically determined based on analyzing the user profile that the user desires to receive emergency-vehicle notifications. A user profile is stored data that includes information relating to the user. For example, it might be stored on a network element that a particular user is hearing impaired. This would indicate that the user might be an interested user—that is, this particular user may desire to receive emergency-vehicle notifications. Alternatively, the user might have stored in his or her user profile that he or she is interested in receiving emergency-vehicle notifications if the vehicle is within 1 mile of the user's location. Other alternatives for indicating that a user is an interested user exist.

At block 410, it is automatically determined to provide an emergency-vehicle notification to the user based on comparing the emergency-vehicle location data and mobile-device location data. For example, an application server may compare emergency-vehicle location data with a particular user's mobile-device location data to determine that the emergency vehicle is within 1 mile of the user. Since the user's profile indicated that he or she would be interested in receiving notifications of active emergency vehicles within 1 mile, it is determined to provide this particular individual with an emergency-vehicle notification.

At block 412, an emergency-vehicle notification is provided to the mobile-device user. For example, upon determining that the mobile-device user is an interested user, the application server above cause a call to be placed to the mobile-device user. This might be accomplished, for example, by the application server communicating with an MSC through a telecommunications network, which communicates to a BSC. The BSC communicates to the appropriate BTS, which causes the mobile-device to respond to the call. This call might serve to notify the user that an emergency vehicle is proximate-and-active—perhaps by utilizing a differential ring or vibration. The user might, either in addition or alternatively, be provided with a voice message informing the user of the current location or anticipated future-location of the emergency vehicle.

Figure 5:
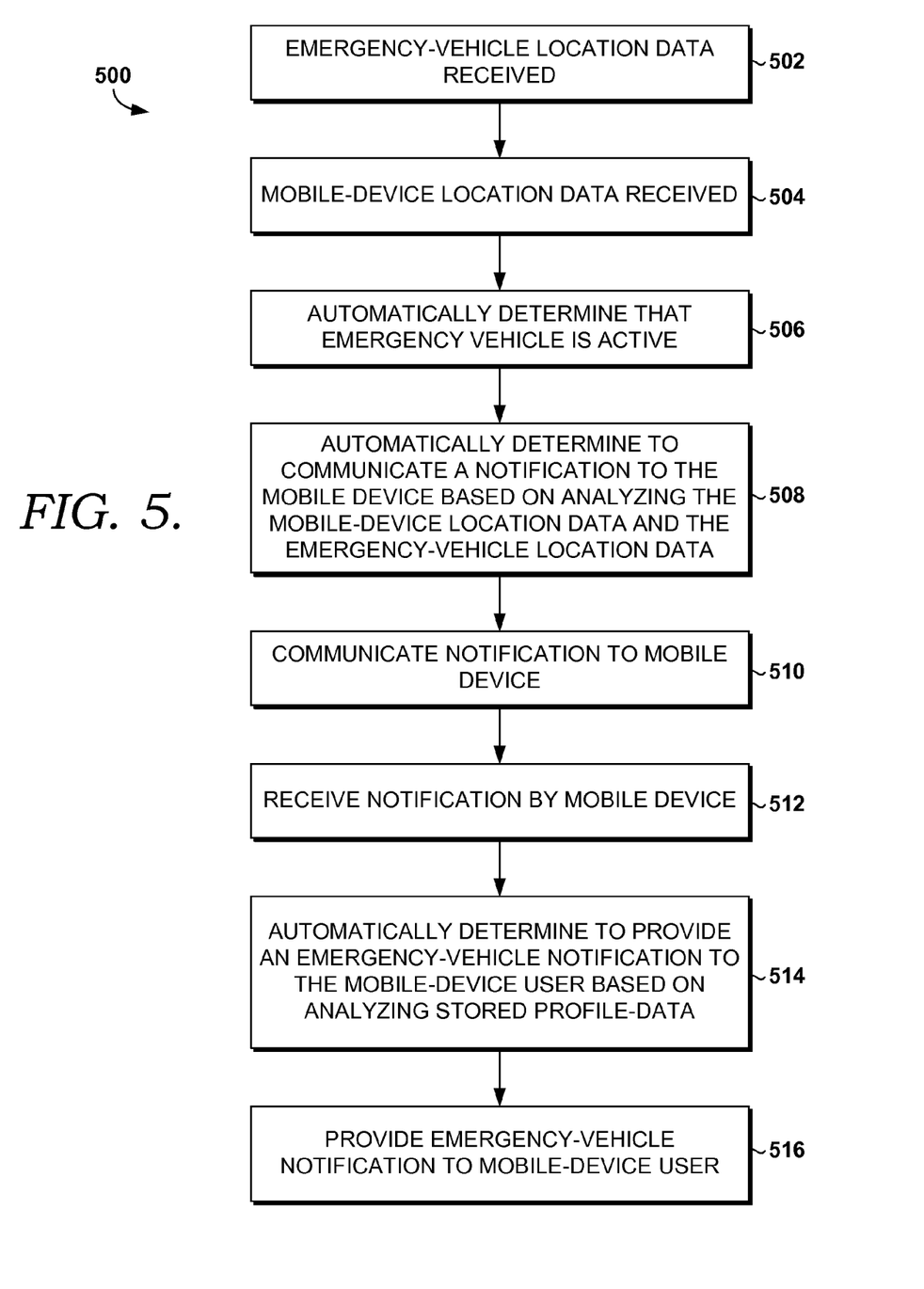
FIG. 5 depicts another flow diagram showing another method for providing an emergency-vehicle notification to a mobile-device user in accordance with an embodiment of the present invention.

Turning now to FIG. 5, a flow diagram showing a method for providing an emergency-vehicle notification to a mobile-device user in accordance with an embodiment of the present invention 500 is depicted. At block 502, emergency-vehicle location data is received. Mobile-device location data is also received, as shown at block 504. At block 506, it is automatically determined that the emergency vehicle is active. It is also automatically determined, based on analyzing emergency-vehicle location data and mobile-device location data, to communicate a notification to the mobile device, as shown at block 508. At block 510, a notification is communicated to the mobile device. At block 512, the notification is received by the mobile device. At block 514, it is automatically determined to provide an emergency-vehicle notification to the mobile-device user based on analyzing stored profile-data. An emergency-vehicle notification is then provided to the mobile-device user, as shown at block 516.

For example, the emergency vehicle might have a device capable of connecting to a cellular network. Location data can be transmitted from this device and received by the network as shown at block 502. At block 504, mobile-device location data is received. For example, a mobile-device user might be using a cell phone that is connected to a BTS. The location of this BTS, as well as the signal strength of other BTSs at this particular location can be received, as shown at block 504. This data may be used to approximate the location of the mobile-device user.

At block 506, it is automatically determined that the emergency vehicle is active. This might be from a signal received from an emergency dispatch center, for example. At block 508, it is automatically determined to communicate a notification to the mobile device based on analyzing the mobile-device location data received at block 504 and the emergency-vehicle location data received at block 502. For example, a server may perform a distance calculation to determine that the emergency-vehicle is within 2 miles of the mobile device. At block 508, a notification is communicated to the mobile device. This might be, for example, a text message. Or, alternatively, this might be control data that will not be perceivable to the user. At block 512, the notification is received by the mobile device. At block 514, it is automatically determined to provide an emergency-vehicle notification to the mobile-device user based on analyzing stored profile data. This stored profile is stored data, on a network element or mobile device, that includes information relating to the user. For example, it may be stored on the user's cell phone that the mobile-device user is hearing impaired. This would indicate that the user should be provided a proximate-and-active-emergency-vehicle notifications upon receiving a notification at block 512. At block 514, an emergency-vehicle notification is provided to the mobile-device user. For example, upon determining that the mobile-device user should be provided with such a notification, the cell phone may differentially vibrate to indicate to the hearing-impaired user that an emergency vehicle is proximate-and-active.

Figure 6:
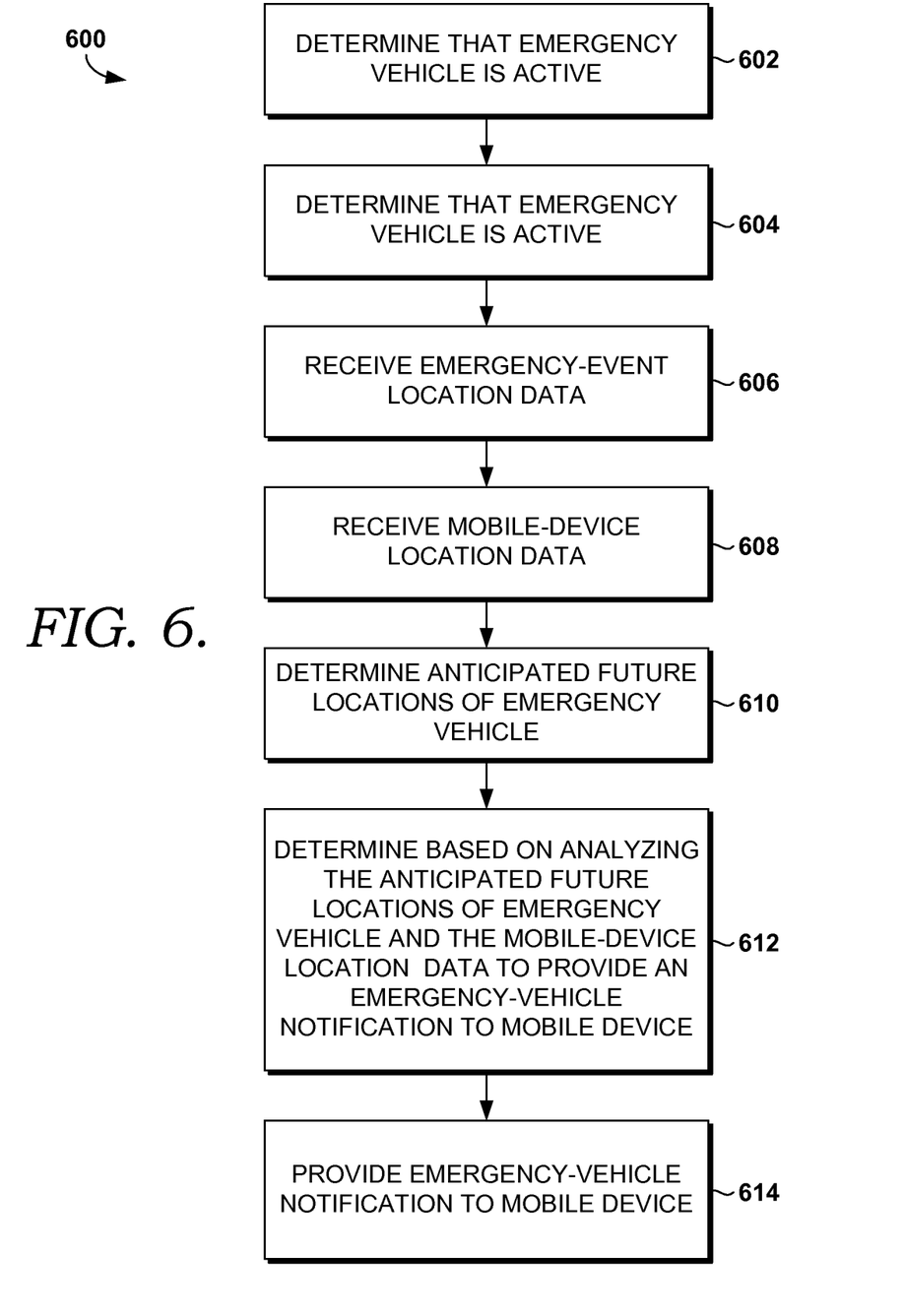
FIG. 6 depicts another flow diagram showing another method for providing an emergency-vehicle notification to a mobile device in accordance with an embodiment of the present invention.

Turning now to FIG. 6, a flow diagram showing a method for providing an emergency-vehicle notification to a mobile-device user in accordance with an embodiment of the present invention 600 is depicted. At block 602, it is determined that the emergency vehicle is active. At block 604, emergency-vehicle location data is received. Emergency-event location data is also received, as shown at block 606. At block 608, mobile-device location data is received. At block 610, one or more anticipated future-locations of the emergency vehicle are determined. At block 612, it is determined based on analyzing one or more anticipated future-locations of the emergency-vehicle and the mobile-device location data to provide an emergency-vehicle notification to the mobile device. At block 614, an emergency-vehicle notification is provided to mobile device.

For instance, it might be determined by receiving emergency-vehicle response data, for example, that an emergency vehicle is active, as illustrated at block 602. Emergency-vehicle location data is received, in manners perhaps similar to those described above, as shown at block 604. Emergency-event location data is received at block 606. Emergency-event location data might include, for example, the location of an emergency event that the emergency-vehicle is responding to. An emergency event may include injuries, criminal activity, fires, natural disasters, etc—or any event that would cause an emergency vehicle to respond and become active. The location of these emergency events might be received by a telecommunications network or network element, such as through an emergency dispatch center or PSAP. The location of these emergency events could also be received through the internet or other communications media. At block 608, mobile-device location data is received, such as GPS data received at a BTS for example. At block 610, one or more anticipated future-locations of the emergency vehicle are determined. This might be accomplished, for example, by determining the roads or highways that the emergency-vehicle must take to proceed to the emergency event. This might also be accomplished, for example, by maintaining a database of routes that emergency vehicles take to get from certain locations to certain emergency-event locations. Upon receiving emergency-vehicle location data and emergency-event location data, the appropriate route could be ascertained from searching the database. Other alternatives exist for determining possible routes for vehicles and anticipated future-locations.

At block 612, it is determined, based on analyzing one or more anticipated future-locations of the emergency-vehicle and the mobile-device location data, to provide an emergency-vehicle notification to the mobile device. For example, it might be determined by an application server that an anticipated future-location of the emergency vehicle will be within 2 blocks of the mobile device's location. Alternatively, it might be determined from the mobile-device location data that the mobile device is northbound on a particular highway. It might be determined by using this data at block 612, for example, that the emergency-vehicle will be within 4 blocks of the mobile device if the mobile device maintains its current course and that the user should thus be provided with a notification. Other alternatives for determining the probable future proximity of an emergency-vehicle to a mobile device exist. At block 614, the mobile device is provided with an emergency-vehicle notification. This may be a text message, differential vibration, Bluetooth communication to a Bluetooth capable device (such as a flashing light coupled to the dashboard or rearview minor for example), etc.

Figure 7:
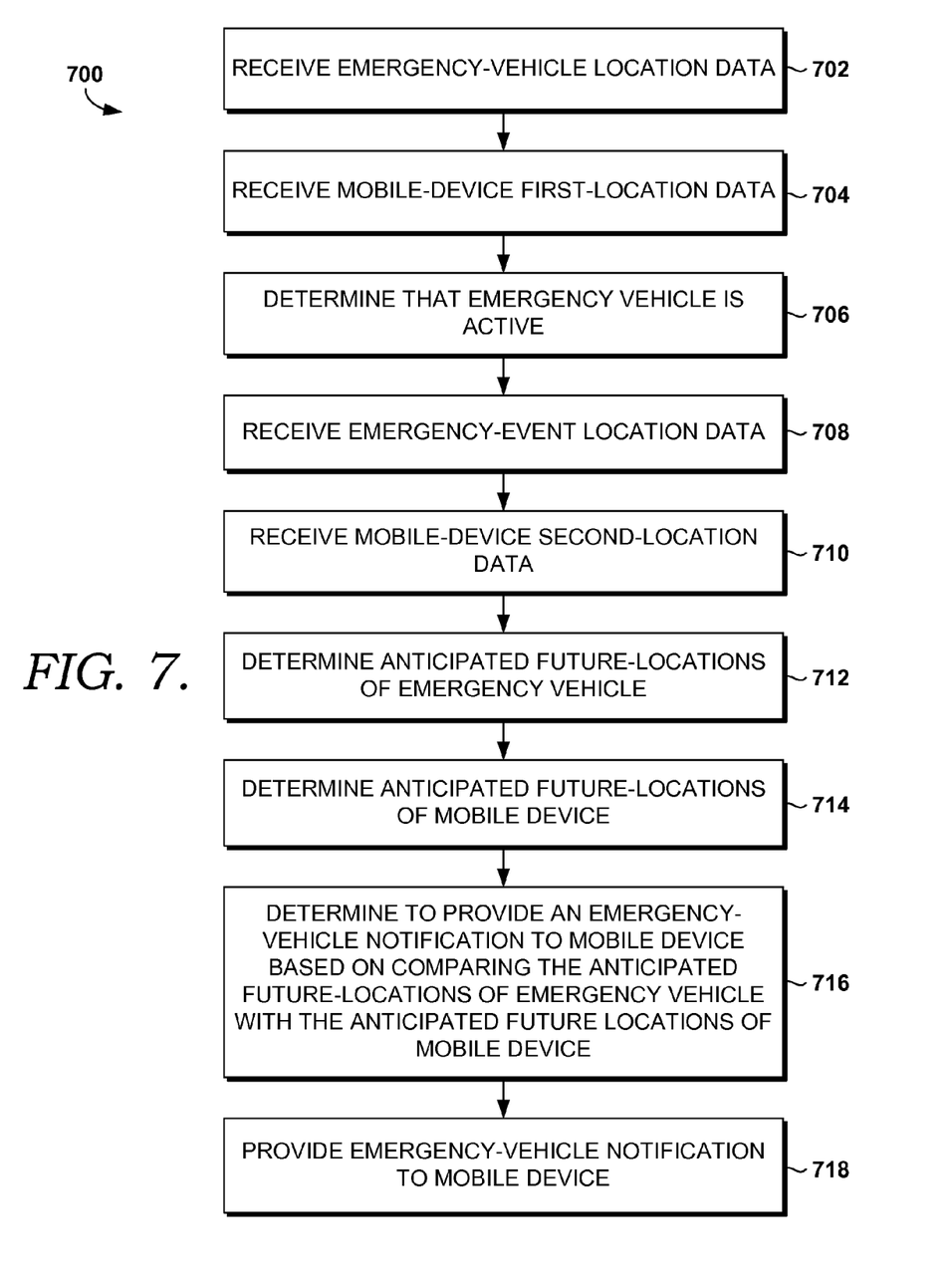
FIG. 7 depicts another flow diagram showing another method for providing an emergency-vehicle notification to a mobile device in accordance with an embodiment of the present invention.

Turning now to FIG. 7, a flow diagram showing a method for providing an emergency-vehicle notification to a mobile device in accordance with an embodiment of the present invention 700 is depicted. At block 702, emergency-vehicle location data is received. At block 704, mobile-device first-location data is received. At block 706, it is determined that the emergency vehicle is active. Emergency-event location data is received, as shown at block 708. At block 710, mobile-device second-location data is received. At block 712, one or more anticipated future-locations of the emergency vehicle are determined. At block 714, one or more anticipated future-locations of the mobile device are determined. At block 716, it is determined based on comparing the anticipated future-locations of the emergency-vehicle with the anticipated future-locations of the mobile device to provide an emergency-vehicle notification to mobile device. At block 718, an emergency-vehicle notification is provided to mobile device.

For example, emergency-vehicle location data is received, as shown at block 702. This may be done, for example, by utilizing gyroscopic equipment which measures the inertial movement of the emergency vehicle. At block 704, mobile-device first-location data is received. This may be GPS data that has been transmitted to, for example, an application server. At block 706 it is determined that an emergency vehicle is active. Emergency-event location data is received, in manners perhaps similar to those described above, as shown at block 708. Mobile-device second-location data is received at block 710. This mobile-device second-location data might be different from the mobile-device first-location data received at block 704—which, if so, could be utilized to determine a direction and rate of movement for the mobile device. The mobile device might be traveling in a car, for example. At block 704, the mobile-device might be at a first location and transmit mobile-device first-location data. At block 710, the car might have traveled 1 mile from when the mobile-device first-location data was received, such that mobile-device second-location data will indicate that the mobile-device is now 1 mile from where it was when first-location data was received at block 704. This will indicate that the mobile-device is traveling approximately from the first location to the second location, at an average rate of speed equal to the distance from the first location to the second location divided by the amount of time between when the first-location data and the second-location data were received. Other methods for calculating the rate and direction of the mobile device exist and could be utilized.

At block 712, one or more anticipated future-locations of the emergency vehicle are determined. This might be accomplished by searching a database of predetermined routes, calculating possible routes in real time, etc, as discussed above. At block 714, one or more anticipated future-locations of the mobile device are determined. This might be accomplished, for example, by analyzing the mobile-device first-location data and mobile-device second-location data and determining a direction and speed, as discussed above. Roads or highways that the mobile-device user may take to continue in this direction could also be determined. Alternatively, the mobile-device user's destination may be known or inferred—as perhaps the user has provided the network with his destination. Other alternatives exist for determining anticipated future-locations for the mobile device.

At block 716, it is determined, based on comparing one or more anticipated future-locations of the emergency-vehicle with one or more anticipated future-locations of the mobile device, to provide an emergency-vehicle notification to the mobile device. For example, it might be determined by an application server connected to a telecommunications network that an anticipated future-location of the emergency vehicle will approximately intersect with one of the mobile-device's anticipated future-locations at a certain time. For example, the emergency-vehicle's route might be determined to cross the route of the mobile device. It might then be calculated that the emergency vehicle and mobile device will be at approximately that point at approximately the same time (if they continue with their routes at approximately their current respective speeds). Other alternatives of utilizing anticipated future locations to determine to provide an emergency-vehicle notification exist.

Many different arrangements of the various components depicted, as well as components not shown, are possible without departing from the scope of the claims below. Embodiments of our technology have been described with the intent to be illustrative rather than restrictive. Alternative embodiments will become apparent readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims.

The invention claimed is:

1. One or more non-transitory computer-readable media having computer-useable instructions embodied thereon that, when executed, enable a given device to perform a method of providing an emergency-vehicle notification to a mobile-device user, the method comprising:
   receiving emergency-vehicle location data at a server that indicates a location of an emergency vehicle, the server being remote from the emergency vehicle;
   receiving mobile-device location data at the server that indicates a location of a mobile device, the server being remote also from the mobile device;
   determining at the server that the emergency vehicle is active;
   determining whether to provide the emergency-vehicle notification to the mobile device based on analyzing the mobile-device location data and the emergency-vehicle location data at the server,
   wherein the mobile-device location data includes the location of the mobile device and a determination of one or more future locations of the mobile device, where such determination includes:
      first-location data, second-location data, a mobile device destination and a rate of movement of the mobile device,
   wherein the emergency-vehicle location data includes the location of the emergency-vehicle and the one or more future locations of the emergency vehicle, where such determination includes:
      emergency-vehicle location, emergency-event location, and an anticipated future location of the emergency-vehicle;
   based on determining to provide the emergency-vehicle notification to the mobile device, providing the emergency-vehicle notification to the mobile device; and
   providing the anticipated future location of the emergency vehicle to the mobile-device user through the mobile device, wherein the mobile device is separate from the emergency vehicle and located outside of the emergency vehicle.

2. The media of claim 1, wherein the mobile-device location data includes one or more of:
   GPS data;
   gyroscopic data;
   BTS data; and
   available wireless networks data.

3. The media of claim 1, wherein the mobile-device user is hearing impaired.

4. The media of claim 1, wherein the emergency-vehicle notification comprises one or more of:
   vibration;
   notification from a device connected to a receiver adapted to communicate via Bluetooth;
   text message; and
   video.

5. The media of claim 1, further comprising:
   determining that the mobile-device user is moving;
   determining the direction of the mobile-device user; and
   determining an anticipated future location of the mobile-device.

6. The media of claim 1, further comprising receiving a destination of the emergency vehicle.

7. The media of claim 1, further comprising:
   determining a direction of the emergency vehicle; and
   providing the direction of the emergency vehicle to the mobile device.

8. One or more non-transitory computer-readable media having computer-useable instructions embodied thereon that, when executed, enable a given device to perform a method of providing an emergency-vehicle notification to a mobile-device user, the method comprising:
   automatically determining at a server that an emergency vehicle is active, the server being remote from the emergency vehicle;
   receiving emergency-vehicle location data at the server that is associated with the emergency vehicle;
   receiving, at the server, mobile-device location data that is associated with a mobile device which is associated with a user profile of a user, the server being remote also from the mobile device and having the user profile stored thereon;
   automatically determining that the user desires to receive the emergency-vehicle notification based on analyzing the user profile;
   automatically determining, at the server, to provide the emergency-vehicle notification to the user based on comparing the mobile-device location data with the emergency-vehicle location data, and based on the determination that the user desires to receive an emergency-vehicle notification,
   wherein the mobile-device location data comprises the location of the mobile device and a determination of one or more future locations of the mobile device, where such determination includes:
      first-location data, second-location data, mobile device destination and rate of movement of the mobile device,
   wherein the emergency-vehicle location data comprises the location of the emergency-vehicle and a determination of one or more future locations of the emergency vehicle, where such determination includes:
      emergency-vehicle location and an emergency-event location; and
   based on automatically determining, at the server, to provide the emergency-vehicle notification to the user, providing the emergency-vehicle notification to the user, wherein the emergency-vehicle notification comprises a text message, wherein the text message includes a route of the emergency-vehicle.

9. The media of claim 8, wherein the user profile comprises one or more of:
   information that the user wishes to receive emergency-vehicle notifications; and
   information that the user is hearing impaired.

10. The media of claim 9, wherein the user profile is stored on one or more of:

an LBS;
a mobile device; and
an application server.

11. The media of claim 8, further comprising automatically determining the direction of the emergency vehicle.

12. The media of claim 11, further comprising providing the direction of the emergency vehicle to the user.

13. The media of claim 11, further comprising:
automatically determining an anticipated future location of the emergency vehicle; and
providing the anticipated future location of the emergency vehicle to the user.

14. One or more non-transitory computer-readable media having computer-useable instructions embodied thereon that, when executed, enable a given device to perform a method of providing an emergency-vehicle notification to a mobile device, the method comprising:
receiving emergency-vehicle location data that indicates the location of an emergency vehicle at a server, the server being remote from the emergency vehicle;
receiving, at the server, mobile-device location data that indicates the location of a mobile device, the server being remote also from the mobile device and having stored profile-data for a user;
automatically determining at the server that the emergency vehicle is active;
automatically determining, at the server, to provide the emergency-vehicle notification to the mobile device based on analyzing the mobile-device location data, the emergency vehicle location data, an element of the profile-data indicating that the user desires to receive a notification,
wherein the mobile-device location data comprises the location of the mobile device and a determination of one or more future locations of the mobile device, where such determination includes:
first-location data, second-location data, mobile device destination and rate of movement of the mobile device;
wherein the emergency-vehicle location data comprises the location of the emergency-vehicle and a determination of one or more future locations of the emergency vehicle, where such determination includes:
emergency-vehicle location, emergency-event location, and anticipated future location of the emergency vehicle;
wherein profile-data indicates that the user desires to receive emergency-vehicle notification when an emergency-vehicle is within a certain proximity of at least one of the following:
the mobile-device location, one or more determined future locations of the mobile device;
based on automatically determining, at the server, to provide an emergency-vehicle notification to the mobile device, providing the emergency-vehicle notification to the mobile device; and
providing the anticipated future location of the emergency vehicle to the mobile-device user through the mobile device, wherein the mobile device is separate from the emergency vehicle and located outside of the emergency vehicle.

15. The media of claim 14, wherein the user is hearing impaired.

16. The media of claim 15, wherein data indicating that the user is hearing impaired is stored on the mobile device.

17. The media of claim 15, wherein data indicating that the user is hearing impaired is stored on a server connected to a network.

18. The media of claim 14, wherein the stored profile-data is stored on the mobile device.

* * * * *